US010274732B2

(12) United States Patent
Robbins et al.

(10) Patent No.: US 10,274,732 B2
(45) Date of Patent: Apr. 30, 2019

(54) HOLOGRAM FOCUS ACCOMMODATION

(71) Applicant: Microsoft Technology Licensing, LLC, Redmond, WA (US)

(72) Inventors: Steven John Robbins, Redmond, WA (US); Xinye Lou, Redmond, WA (US); Eliezer M. Glik, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/481,325

(22) Filed: Apr. 6, 2017

(65) Prior Publication Data

US 2018/0129048 A1 May 10, 2018

Related U.S. Application Data

(60) Provisional application No. 62/417,846, filed on Nov. 4, 2016.

(51) Int. Cl.
*G02B 27/00* (2006.01)
*G02B 27/01* (2006.01)
(Continued)

(52) U.S. Cl.
CPC ....... *G02B 27/0172* (2013.01); *G02B 27/283* (2013.01); *G02B 27/4205* (2013.01);
(Continued)

(58) Field of Classification Search
CPC ............... G02B 27/0172; G02B 26/02; G02B 27/0025; G02B 27/0179; G02B 27/283;
(Continued)

(56) References Cited

U.S. PATENT DOCUMENTS 6,816,290 B2  11/2004  Mukawa
7,177,496 B1   2/2007  Polynkin et al.
(Continued)

FOREIGN PATENT DOCUMENTS

WO    WO-2002005270    1/2002

OTHER PUBLICATIONS

Sharangovich,"The Analytical Model of Light Beams Diffraction on the Holographic Photonic PDLC Structure under the Influence of a Spatially Non-uniform Electric Field", In Journal of Pacific Science Review, vol. 15, Issue 3, Dec. 2013, pp. 118-124.

*Primary Examiner* — Nathanael R Briggs
(74) *Attorney, Agent, or Firm* — Rainier Patents, P.S.

(57) ABSTRACT

In implementations of hologram focus accommodation, a focus accommodation system is implemented for variable focus of a generated image, such as a hologram, that is displayed for viewing on a waveguide display. The focus accommodation system includes switchable polarization retarders that rotate a polarization of light of the generated image, where the light passes through the switchable polarization retarders along an imaging path in which the generated image is viewable. The focus accommodation system also includes polarization sensitive gratings alternatingly interspersed with the switchable polarization retarders. Each of the polarization sensitive gratings are configurable to diffract the light in a first polarization state and transmit the light in a second polarization state. The variable focus is adjustable to a focal distance at which a user perceives viewing the generated image as displayed by the waveguide display.

19 Claims, 7 Drawing Sheets

(51) Int. Cl.
    *G02B 27/42*       (2006.01)
    *G02B 27/28*       (2006.01)

(52) U.S. Cl.
    CPC .. *G02B 27/4261* (2013.01); *G02B 2027/0134* (2013.01); *G02B 2027/0174* (2013.01); *G02B 2027/0185* (2013.01)

(58) Field of Classification Search
    CPC ............ G02B 27/4205; G02B 27/4261; G02B 2027/0134; G02B 2027/0174; G02B 2027/0185; G03H 1/08; G03H 1/2205; G03H 2223/17; G03H 2223/20; G03H 2223/23; G02F 1/1323
    See application file for complete search history.

(56) References Cited

U.S. PATENT DOCUMENTS

| | | |
|---|---|---|
| 7,277,210 B2 | 10/2007 | Lipson |
| 8,023,385 B2 | 9/2011 | Jung |
| 8,183,753 B2 | 5/2012 | Kanade et al. |
| 2001/0024177 A1 | 9/2001 | Popovich |
| 2008/0062486 A1 | 3/2008 | Jeong et al. |
| 2009/0073850 A1 | 3/2009 | Ide et al. |
| 2009/0153929 A1 | 6/2009 | Jeong et al. |
| 2012/0081621 A1 | 4/2012 | Dorschner et al. |
| 2013/0170004 A1 | 7/2013 | Futterer |
| 2014/0285878 A1 | 9/2014 | Escuti et al. |
| 2014/0300709 A1* | 10/2014 | Futterer ............... G03H 1/2286 348/51 |
| 2015/0235444 A1 | 8/2015 | Schowengerdt |
| 2016/0238772 A1* | 8/2016 | Waldern ................... G02B 5/32 |

* cited by examiner

HOLOGRAM FOCUS ACCOMMODATION

RELATED APPLICATION

This application claims priority under 35 U.S.C. § 119(e) to U.S. Provisional Patent Application Ser. No. 62/417,846 filed Nov. 4, 2016 entitled "Hologram Focus Accommodation", the disclosure of which is incorporated by reference herein in its entirety.

BACKGROUND

Virtual reality and augmented reality systems and devices are increasingly popular, particularly for applications in which a user can immerse him or herself into an alternate reality environment when wearing a head-mounted display that displays virtual and/or augmented reality user experiences. Generally, virtual reality can be viewed as a computer-generated simulated environment in which a user has an apparent physical presence. A virtual reality experience can be generated in 3D and viewed with a head-mounted display, such as glasses or other wearable display device that has near-eye display panels as lenses to display a virtual reality environment, which replaces the actual environment. Augmented reality, however, provides that a user can still see through the display lenses of the glasses or other wearable display device to view the surrounding environment, yet also see images of virtual objects, such as holograms, that are generated for display and appear as a part of the environment. Augmented reality can include any type of virtual images or graphics that enhance or augment the environment that a user experiences. As an emerging technology, there are many challenges and design constraints with augmented and virtual reality, from generation of the virtual objects and images so that they appear realistic in a real environment, to developing the optics small and precise enough for implementation with a wearable display device.

Some focusing systems for display technologies are typically too large and complex to be implemented in imaging units for wearable display devices. A mechanical mechanism to adjust focus is generally noisy, uses quite a lot of power, and is likely to be too slow to keep up with eye movement. Focus accommodation for augmented reality near-eye displays is needed so that the conflict between stereopsis and focus accommodation cues is negated. However, current techniques for focus accommodation in waveguide displays are problematic, and proposed solutions are not ideal from mechanical implementations, optical performance, and latency perspectives. With stereopsis, a virtual image that is projected or displayed for augmented reality imaging appears at focal infinity while a real object in the environment over which the virtual image is displayed appears closer. A viewer's eyes attempt to focus on the nearer, real object while also focusing at infinity even though the virtual image is projected very close to the viewer's eyes. This can cause viewing fatigue, which may diminish the user experience when using a wearable display device. In some systems, a lens may be utilized to make a virtual image appear closer, such as at two meters as a fixed distance compromise to adjust the perceived focal length. However, the fixed focal distance may diminish the user experience when viewing real objects at different distances in an environment while the virtual image appears static and unmoving at the fixed focal distance.

SUMMARY

This Summary introduces features and concepts of hologram focus accommodation, which is further described below in the Detailed Description and shown in the Figures. This Summary should not be considered to describe essential features of the claimed subject matter, nor used to determine or limit the scope of the claimed subject matter.

Hologram focus accommodation is described. In implementations, a focus accommodation system can be implemented for variable focus of a generated image, such as a hologram, that is displayed for viewing on a waveguide display. The focus accommodation system includes switchable polarization retarders that rotate a polarization of light of the generated image, where the light passes through the switchable polarization retarders along an imaging path in which the generated image is viewable. The focus accommodation system also includes polarization sensitive gratings alternatingly interspersed with the switchable polarization retarders, and the light of the generated image passes through the polarization sensitive gratings along the imaging path. Each of the switchable polarization retarders is combined with an associated polarization sensitive grating to form lenses of the focus accommodation system. Each of the polarization sensitive gratings are configurable to diffract the light in a first polarization state and transmit the light in a second polarization state. The variable focus is adjustable to a focal distance at which a user perceives viewing the generated image as displayed by the waveguide display. The variable focus of the generated image is controllable with the one or more lenses to resolve a focus accommodation and stereopsis conflict for a user viewing the generated image.

In aspects of hologram focus accommodation, the focus accommodation system includes a light controller that is implemented to allow environment light entering and passing through the focus accommodation system while the waveguide display, the switchable polarization retarders, and the polarization sensitive gratings are inactive, and then control the environment light while the waveguide display, the switchable polarization retarders, and the polarization sensitive gratings are active. In an implementation, the light controller is a shutter system that includes a shutter positioned between a first linear polarizer and a second liner polarizer adjacent a waveplate. Alternatively, the light controller is a complementary lens system to the lenses of the focus accommodation system. In other aspects, the focus accommodation system can be implemented with a fixed refractive lens that adds focal length to the imaging path by use in conjunction with a diffractive lens formed by a switchable polarization retarder and an associated polarization sensitive grating. This implementation can also include a complementary refractive lens that offsets the fixed refractive lens for an undistorted image of the environment that is viewed through the focus accommodation system.

In other aspects of hologram focus accommodation, each of the switchable polarization retarders is combined with an associated polarization sensitive grating to form lenses of the focus accommodation system. The lenses can be activated to diffract and change an angle of the light of the generated image, or transmit the light of the generated image at an unaltered angle. In implementations, two of the lenses provide a four-step, multi-focus accommodation effective to represent the generated image appearing between a near focal distance and infinity. Similarly, three of the lenses provide an eight-step, multi-focus accommodation effective to represent the generated image appearing between a near focal distance and infinity.

BRIEF DESCRIPTION OF THE DRAWINGS

Implementations of hologram focus accommodation are described with reference to the following Figures. The same numbers may be used throughout to reference like features and components that are shown in the Figures.

DETAILED DESCRIPTION

Figure 1:
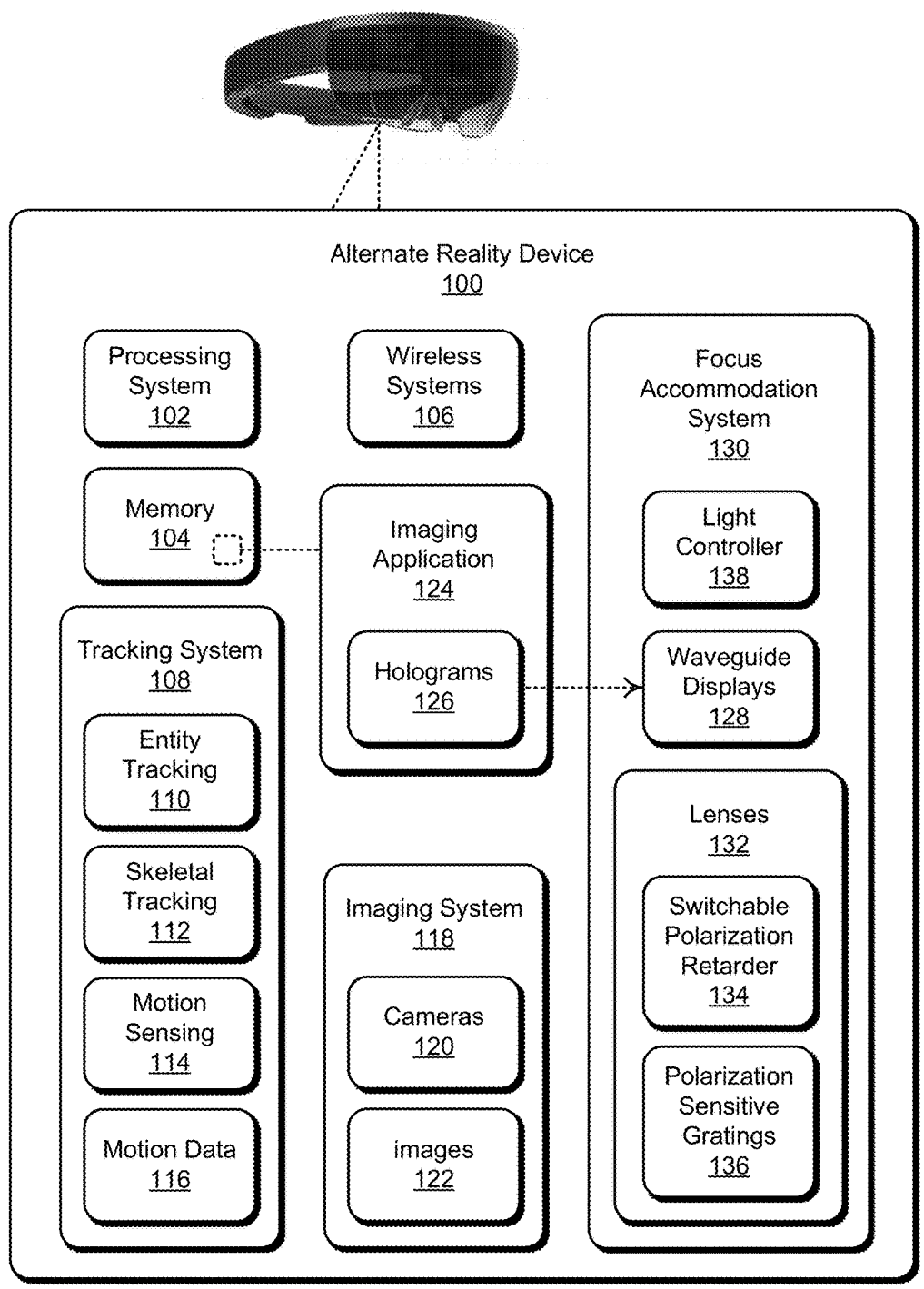
FIG. 1 illustrates an example alternate reality device that can implement hologram focus accommodation with a focus accommodation system.

Implementations of hologram focus accommodation are described. A person can wear a head-mounted display unit to immerse him or herself in a virtual and/or augmented reality environment. Generally, the term "alternate reality" is used herein to refer to devices and systems that are implemented for virtual reality and/or augmented reality, such as alternate reality devices. A head-mounted display unit is an alternate reality device that can be worn by a user and implemented with various systems and sensors to generate a hologram (i.e., a generated image or graphic) that appears in an environment with real objects.

In implementations, an alternate reality device, such as a head-mounted display unit, can be implemented with an imaging application that generates a hologram for display on waveguide displays that provide a simulated stereo display in the alternate reality device. The alternate reality device can also include a focus accommodation system that is implemented for variable focus of a generated image or graphic (e.g., a hologram). The focus accommodation system provides the variable focus, which appears to a viewer who is wearing the device as real focusing of a generated image at arbitrary focal lengths, using a number of switchable polarization retarders and polarization sensitive gratings. A combination of a switchable polarization retarder and an associated polarization sensitive grating forms a lens that can be activated to diffract and change an angle of light of the generated image, or transmit the light of the generated image at an unaltered angle.

Multiple lenses can be configured together to implement a multi-focus accommodation effective to represent the generated image (e.g., the hologram) appearing between a near focal distance and infinity, such as between a meter or one-half of a meter and infinity. The variable focus correlates to a change in focus of the waveguide displays, and the hologram can then appear as if it is right in front of a viewer or far away without causing vergence discomfort from the simulated stereo display in the alternate reality device. The variable focus of the generated image is controllable with the lenses to resolve the focus accommodation and stereopsis conflict for a user viewing the generated image while wearing the alternate reality device.

In the focus accommodation system, the switchable polarization retarders (also generally referred to as shutter switches) rotate a polarization of the light of the generated image, where the light passes through the switchable polarization retarders along an imaging path in which the generated image is viewable. The polarization sensitive gratings are alternatingly interspersed with the switchable polarization retarders, and the light of the generated image passes through the polarization sensitive gratings along the imaging path. Each of the polarization sensitive gratings are configurable to diffract the light in a first polarization state and transmit the light in a second polarization state. The light of the generated image travels along the imaging path in the alternate reality device, and the variable focus is adjustable to a focal distance at which a user perceives viewing the generated image as displayed by the waveguide displays.

The focus accommodation system for hologram focus accommodation can also include a light controller that is implemented to control environmental light entering the alternate reality device from the external environment in which the viewer perceives the hologram as it appears to exist in the external environment. The light controller allows the environment light to enter and pass through the focus accommodation system while the waveguide display and the lenses (e.g., each switchable polarization retarder and associated polarization sensitive grating) are inactive. The light controller also controls the environment light while the waveguide display and the lenses are active, such as to block, alter, or dim the environment light for a brief duration of time during which the hologram is generated for viewing in the alternate reality device.

The light controller can be implemented in the focus accommodation system with various techniques. For example, the light controller can be a shutter system that is implemented with a shutter positioned between a first linear polarizer and a second liner polarizer adjacent a waveplate. Alternatively, the light controller is a complementary lens system to the lenses of the focus accommodation system. From a perspective of the viewer who is wearing the alternate reality device, the lenses of the focus accommodation system are positioned in the imaging path between the waveguide display and an eye of the viewer (e.g., one each for the left and right eyes of the person wearing the alternate reality device). The complementary lens system is positioned between the waveguide display and the environment to then control the environment light that enters and/or passes through the focus accommodation system. Alternatively, the focus accommodation system can be implemented with a fixed refractive lens that adds focal length to the imaging path by use in conjunction with a diffractive lens formed by a switchable polarization retarder and an associated polarization sensitive grating. This implementation can also include a complementary refractive lens that offsets the fixed refractive lens for an undistorted image of the environment that is viewed through the focus accommodation system.

As noted above, multiple lenses that are combinations of a switchable polarization retarder and an associated polarization sensitive grating can be configured together to implement a multi-focus accommodation effective to represent a generated image (e.g., a hologram) appearing between a near focal distance and infinity. In implementations, a combination of three of the lenses provides an eight-step, multi-focus accommodation, whereas a combination of two of the lenses provides a four-step, multi-focus accommodation. Alternatively, one lens provides a two-step, multi-focus accommodation. Generally, any number of the lenses can be configured together for a more or less discrete focus accommodation system, where stacking multiple lenses together adds optical power and can be used to achieve more discrete optical powers.

While features and concepts of hologram focus accommodation can be implemented in any number of different devices, systems, networks, environments, and/or configurations, implementations of hologram focus accommodation are described in the context of the following example devices, systems, and methods.

FIG. 1 illustrates an example alternate reality device 100 in which implementations of hologram focus accommodation can be implemented. The example alternate reality device 100 can be implemented with various components, such as a processing system 102 and memory 104 (e.g., non-volatile, physical memory), and with any number and combination of differing components as further described with reference to the example device shown in FIG. 8. In implementations, the processing system 102 may include multiple and/or different processors, such as a microprocessor, a separate graphics processor, and/or a separate high-speed, dedicated processor for tracking motion of the alternate reality device. Although not shown, the alternate reality device 100 includes a power source, such as a battery, to power the various device components. Further, the alternate reality device 100 is a wireless communication-enabled device and can include different wireless radio systems 106, such as for Wi-Fi, Bluetooth™, Mobile Broadband, LTE, as well as 802.11a/b/g/n/ac network connectivity technologies, and/or any other wireless communication system or format. Generally, the alternate reality device 100 implements one or more wireless communication systems that each include a radio device, antenna, and chipset that is implemented for wireless communication with other devices, networks, and services.

The alternate reality device 100 can include various different types of sensors and systems to implement the features and aspects of hologram focus accommodation in an environment, such as in three-dimensional (3D) indoor or outdoor space. The alternate reality device 100 includes a tracking system 108 for entity tracking 110 that is implemented to recognize and track movement of an entity in the environment. The tracking system 108 can recognize an entity in the environment as a person or features of the person (e.g., an arm, hand, head, etc.), an animal (e.g., a dog or cat), or an object, such as a chair, a table, or other item that may be moved by a person. The tracking system 108 can include skeletal tracking 112 to track the movement of a person or a feature of the person in the environment, where the person or feature of the person, may be the person using the alternate reality device, or can be a different person in the environment.

The tracking system 108 can also include motion sensing 114 or any other human motion capture system to track the movement of the person or the feature of the person in the environment, as motion data 116. The tracking system 108 can also track an object that is capable of being moved in the environment, such as a chair or other type of object that is movable by a person. In addition to static objects that are cable of being moved, the tracking system 108 can also track an entity that moves dynamically in the environment, such as a person or a dog that may move in any direction at any time in the environment. In embodiments, the tracking system 108 may be implemented with the motion capture technology of the KINECT system from Microsoft for human motion capture. Generally, the tracking system can be implemented as a sensors and motion sensing device with a natural user interface for detecting gestures and voiced commands for hands-free control of other devices, such as implemented for 3D motion capture, facial recognition, and voice recognition.

In addition to the entity tracking 110, the skeletal tracking 112, and the motion sensing 114, the tracking system 108 may include an imaging system 118 with an infra-red projector, a depth sensor, and/or a depth camera (or cameras) that captures images of the environment in which the device is located. The imaging system 118 of the alternate reality device 100 has one or more cameras 120 that capture images 122 of the environment in which the alternate reality device is being used. In implementations, the cameras 120 can be visual light cameras, such as high-speed monochromatic or black-and-white cameras that capture the images 122 in the 3D environment. Alternatively, a single camera 120 can be implemented with simultaneous localization and mapping (SLAM) for the 3D imaging of the environment, to initially recognize entities in the environment, and then track the entities.

In this example, the alternate reality device 100 includes an imaging application 124 that is implemented to generate holograms 126 for display on waveguide displays 128 of a focus accommodation system 130. The imaging application 124 can be implemented as a software application or modules, such as computer-executable software instructions that are executable with the processing system 102 to implement examples of hologram focus accommodation. As indicated, the imaging application 124 can be stored on computer-readable storage memory (e.g., the memory 104), such as any suitable memory device or electronic data storage implemented in the alternate reality device.

The focus accommodation system 130 includes the waveguide displays 128 on which the holograms 126 can be displayed. As described below with reference to FIG. 2, the waveguide displays 128 provide a simulated stereo display of a hologram 126 in the alternate reality device 100 and can be implemented for see-through viewing of an environment that is viewable through an imaging structure that includes the focus accommodation system 130. In this example, the focus accommodation system 130 is implemented with one or more lenses 132 that are each formed as a combination of a switchable polarization retarder 134 and an associated polarization sensitive grating 136. The focus accommodation system 130 also includes an implementation of a light controller 138 that is designed to control environmental light entering the alternate reality device 100 from the external environment in which a viewer perceives a hologram 126 as it appears to exist in the external environment. These components of the focus accommodation system 130 are further described below with reference to the examples of focus accommodation systems shown in FIGS. 2-6. Generally, the focus accommodation system 130 provides a variable focus, which appears to a viewer who is wearing the alternate reality device 100 as real focusing of a hologram 126 at arbitrary focal lengths, using a number of the switchable polarization retarders 134 and the polarization sensitive gratings 136. The focal distance at which the user views an object can be set or selected as a design choice of the system. Multiple lenses 132 can be configured together to implement a multi-focus accommodation effective to represent a generated image (e.g., a hologram) appearing between a near focal distance and infinity.

Figure 2:
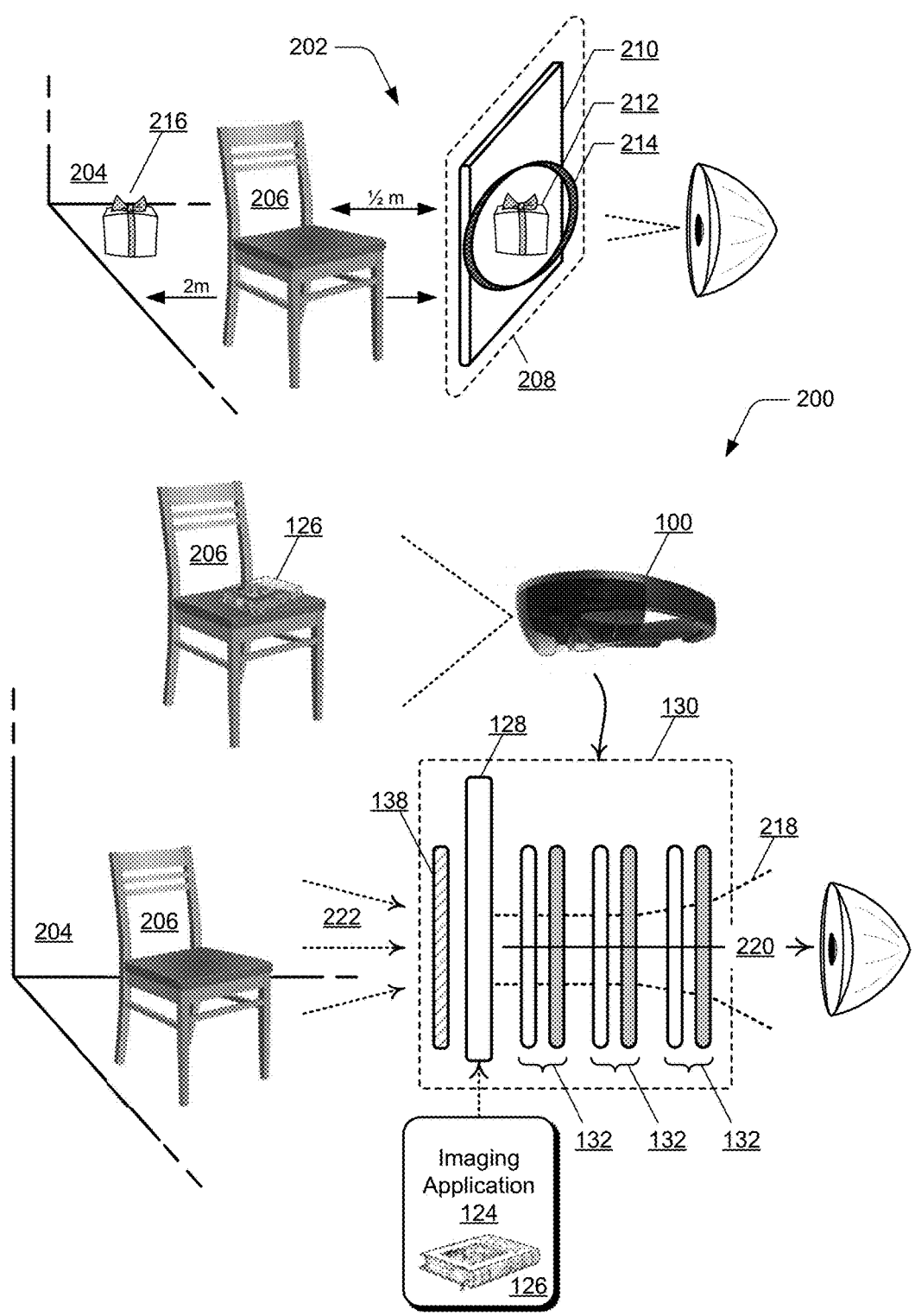
FIG. 2 illustrates an example of the focus accommodation system implemented for hologram focus accommodation in an alternate reality device.

FIG. 2 illustrates an example 200 of the focus accommodation system 130 implemented for hologram focus accommodation in the alternate reality device 100. As described herein, the alternate reality device 100 that is shown and described with reference to FIG. 1 can be worn by a person to immerse him or herself in a virtual and/or augmented reality environment, and the term "alternate reality" is used herein to refer to virtual reality and/or augmented reality. As shown at 202, an augmented reality environment 204 (e.g., a room or an area) includes a real object (e.g., a chair 206). The chair 206 is positioned approximately one-half meter (½ m) away from a user who is viewing the augmented reality environment 204 through a conventional focusing system 208 of an augmented reality device. The conventional focusing system 208 includes a near-eye display panel 210 on which a virtual image 212 is displayed and viewed through a fixed two meter (2 m) lens 214. As noted above with stereopsis, the virtual image 212 projected on the near-eye display panel 210 appears at focal infinity 216 while the chair 206 in the environment over which the virtual image should be displayed appears closer. The viewer's eyes attempt to focus on the chair (i.e., the nearer, real object) while also focusing at infinity 216 even though the virtual image 212 is projected very close to the viewer's eyes.

The techniques of hologram focus accommodation described herein provide a variable focus that is adjustable to a focal distance at which a user perceives viewing a generated image (e.g., the hologram 126) as displayed by the waveguide display 128. The variable focus of the generated image is controllable with the one or more lenses 132 of the focus accommodation system 130 to resolve the focus accommodation and stereopsis conflict for a user wearing the alternate reality device 100 and viewing the generated image. In this example 200, the imaging application 124 can generate a hologram 126 of a book that appears in the alternate reality view, to the person wearing the alternate reality device 100, to be positioned on the chair 206 in the environment 204. Note that a hologram 126 may appear to be placed on, positioned on, attached to, or proximate an entity (e.g., an object, furniture, a person, or a feature of the person) in the alternate reality view.

The alternate reality device 100 includes, for each of the left and right eye of the person wearing the alternate reality device, the focus accommodation system 130. The imaging application 124 generates the hologram 126 that is displayed on each of the left and right waveguide displays 128 of the focus accommodation system. The waveguide displays 128 can each be implemented as a waveguide module assembly with a near-eye display. In this example, the focus accommodation system 130 is implemented with one or more of the lenses 132 that are each formed as a combination of a switchable polarization retarder 134 and an associated polarization sensitive grating 136. Examples of the lenses 132 in the focus accommodation system 130 are further shown and described with reference to FIGS. 3-6.

In this example 200, the lenses 132 are configurable together to provide for a focal distance of infinity, and alternatively, the lenses can be activated for a shortest, near-focal distance of the variable focus. Accordingly, the one or more lenses 132 change the focal distance as perceived by the user viewing the generated image (e.g., the hologram 126). Generally, the focus accommodation system 130 provides the variable focus, which appears to a viewer as real focusing of the hologram 126 on the chair 206 using the one or more lenses 132. The light 218 of the generated image (e.g., the hologram 126) that is displayed on the waveguide display 128 passes through the lenses 132 along an imaging path 220 in which the generated image is viewable and the light 218 of the generated image diverges towards the eye of the viewer. The focus accommodation system 130 also includes the light controller 138 that is implemented to control the environment light 222 (also referred to as the see-through light) entering the alternate reality device 100 from the external environment 204 in which the viewer perceives the hologram 126 as it appears to exist in the external environment.

In this example 200, three of the lenses 132 implement an eight-step, multi-focus accommodation effective to represent the generated image (e.g., the hologram 126) appearing between a near focal distance and infinity. For example, combinations of the three lenses 132 provide seven variable focal lengths and infinity, where (1) the three lenses all off is infinity, and (2) the three lenses all on provides the shortest, near focal length, such as at a meter or half of a meter. The variable focal lengths in between are provided by (3) the first lens on with the second and third lenses off, (4) the second lens on with the first and third lenses off, (5) the third lens on with the first and second lenses off, (6) the first and second lenses on with the third lens off, (7) the first and third lenses on with the second lens off, and (8) the second and third lenses on and the first lens off. In other implementations, a combination of two of the lenses 132 provides a four-step, multi-focus accommodation. Alternatively, one lens 132 provides a two-step, multi-focus accommodation. Generally, any number of the lenses 132 can be configured together for a more or less discrete focus accommodation system, where stacking multiple lenses together adds optical power and can be used to achieve more discrete optical powers.

Figure 3:
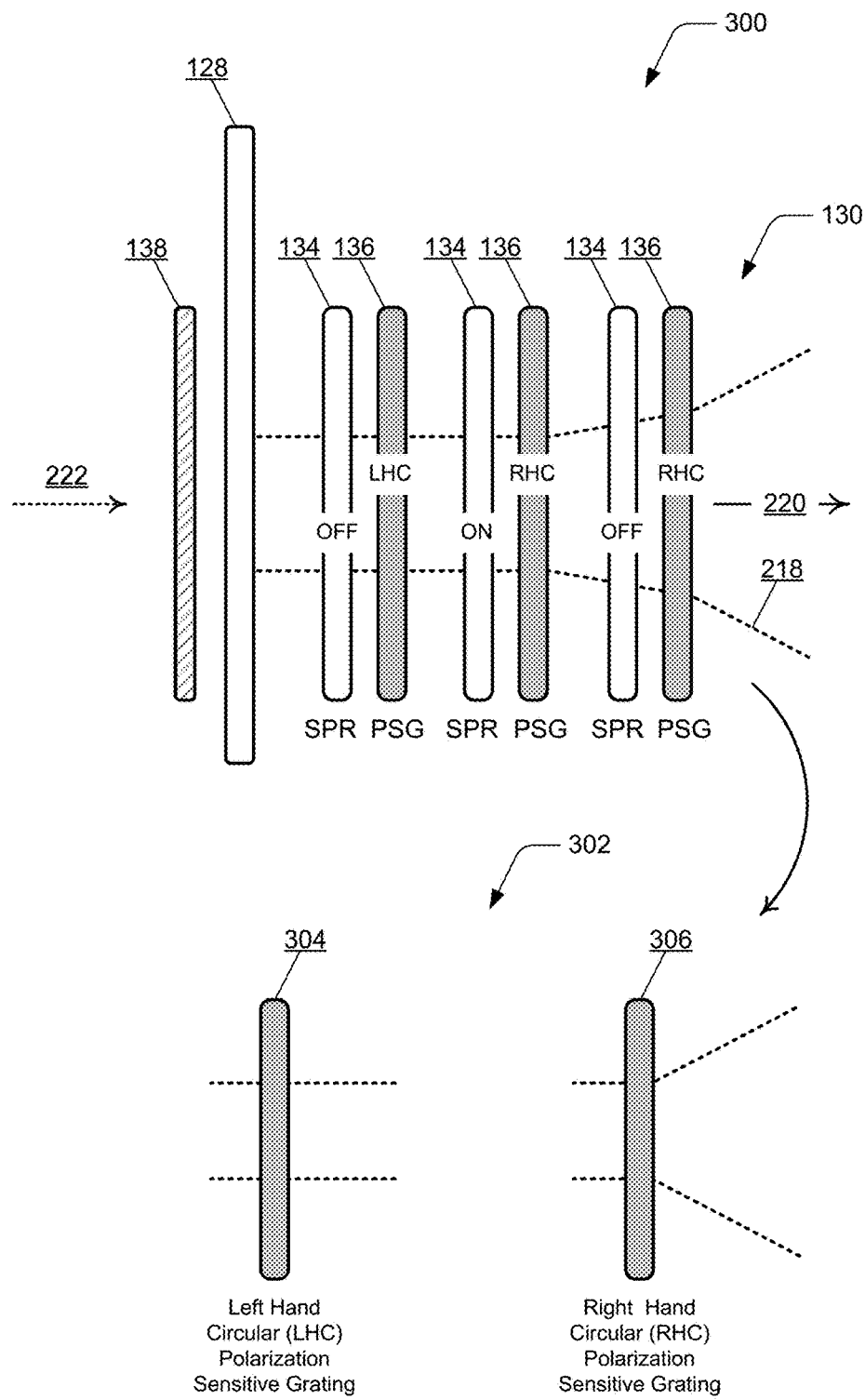
FIG. 3 further illustrates the focus accommodation system implemented for hologram focus accommodation in the alternate reality device.

FIG. 3 illustrates an example 300 of the focus accommodation system 130 implemented for hologram focus accommodation in the alternate reality device 100, such as shown and described with reference to FIG. 2. In this example, three of the switchable polarization retarders (SPR) 134 and three of the polarization sensitive gratings (PSG) 136 alternatingly interspersed with the switchable polarization retarders form three lenses 132 of the focus accommodation system 130 to implement an eight-step, multi-focus accommodation effective to represent the generated image (e.g., the hologram 126) appearing between a near focal distance and infinity. As described above, the light 218 of the generated image (e.g., the hologram 126) that is displayed on the waveguide display 128 passes through the switchable polarization retarders 134 and the polarization sensitive gratings 136 along an imaging path 220 in which the generated image is viewable.

The switchable polarization retarders are implemented in the lenses 132 to rotate a polarization of the light 218 of the generated image. As shown at 302, each of the polarization sensitive gratings 136 can be implemented as a left hand circular (LHC) polarization sensitive grating 304 or as a right hand circular (RHC) polarization sensitive grating 306. A left hand circular polarization sensitive grating 304 transmits the light 218 of the generated image through the polarization sensitive grating without altering the angle of the light when activated by the corresponding switchable polarization retarder 134 that is turned on. A right hand circular polarization sensitive grating 306 diffracts the light 218 of the generated image when activated by the corresponding switchable polarization retarder 134 that is turned on. Accordingly, each of the polarization sensitive gratings 136 are configurable to diffract the light in a first polarization state and transmit the light in a second polarization state. By combining switchable polarization retarders 134 with the polarization sensitive gratings 136 to form the one or more lenses 132 of the focus accommodation system 130, the light 218 can be selectively routed through the lenses while having the ability to "turn off" any individual lens.

In implementations of hologram focus accommodation, the switchable polarization retarders 134 are liquid crystal (LC) cells operable as polarization retarders, such as a polarization modulator that electronically controls the polarization output of light passing through and which provides a very fast switching. An example implementation of a switchable polarization retarder is the DepthQ® polarization modulator that is available from LC-Tec and Lightspeed Design Inc. which enables thirty microsecond (30 µs) switching speed. This fast switching speed accommodates user eye-tracking in conjunction with the techniques described for hologram focus accommodation, particularly when tracking an object and change focus depth as the object moves. Other, different types of switchable polarization retarders may be utilized to implement the techniques for hologram focus accommodation as described herein.

Further, different types of the polarization sensitive gratings 136 can be implemented, such as polarization sensitive gratings that are operable with linear polarized light, and other polarization sensitive gratings that are operable with circular polarized light. For example, the polarization sensitive gratings 136 can be Bragg polarization gratings that are designed to alter the direction of light propagation as the light passes through. The Bragg polarization gratings are small in size, yet allow broad angular and spectral bandwidth allowing the lenses 132 to be used in the visible spectrum. An example implementation of a Bragg polarization grating is the Bragg LC polarization grating described by Escuti et al. in U.S. Patent Application Publication No. 2016/0033698. Other, different types of polarization sensitive gratings that are sensitive to polarized light may be utilized to implement the techniques for hologram focus accommodation as described herein.

The focus accommodation system 130 also includes the light controller 138 that is implemented to manage and control the environment light 222 (also referred to as the see-through light) entering the focus accommodation system from the external environment. The light controller 138 allows the environment light 222 to enter and pass through the focus accommodation system 130 while the waveguide display 128 and the lenses 132 (e.g., each switchable polarization retarder 134 and associated polarization sensitive grating 136) are inactive. The light controller 138 also controls the environment light 222 while the waveguide display 128 and the lenses 132 are active, such as to block, alter, or dim the environment light 222 for a brief duration of time during which the hologram 126 is generated for viewing in the alternate reality device. The light controller can alter the environment light 222 by offsetting the polarization states of the light.

Figure 4:
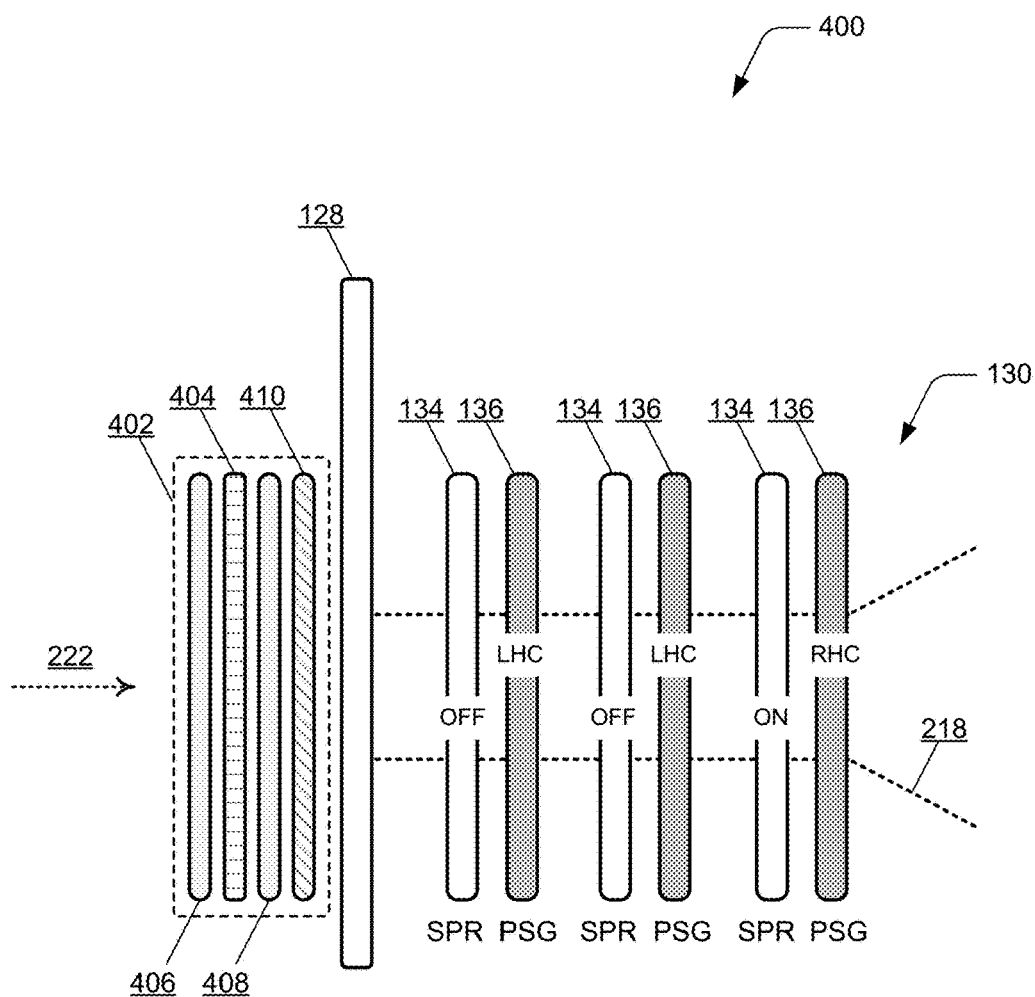
FIG. 4 illustrates a light controller implemented as a shutter system for the focus accommodation system in aspects of hologram focus accommodation.

FIG. 4 illustrates an example 400 of the focus accommodation system 130 implemented for hologram focus accommodation in the alternate reality device 100, such as shown and described with reference to FIGS. 2 and 3. In this example 400, the light controller 138 is implemented as a shutter system 402 to manage and control the environment light 222 (the see-through light) entering the focus accommodation system 130 from the external environment. The shutter system 402 includes a shutter 404 positioned between a first linear polarizer 406 and a second liner polarizer 408 adjacent a waveplate 410, such as a one-quarter (¼) waveplate. The shutter 404 can be implemented as a liquid crystal (LC) shutter or similar dimming type panel. Overall, the shutter system 402 can be implemented to block, alter, or dim the environment light 222 for a brief duration of time during which the hologram 126 is generated for viewing in the alternate reality device.

Figure 5:
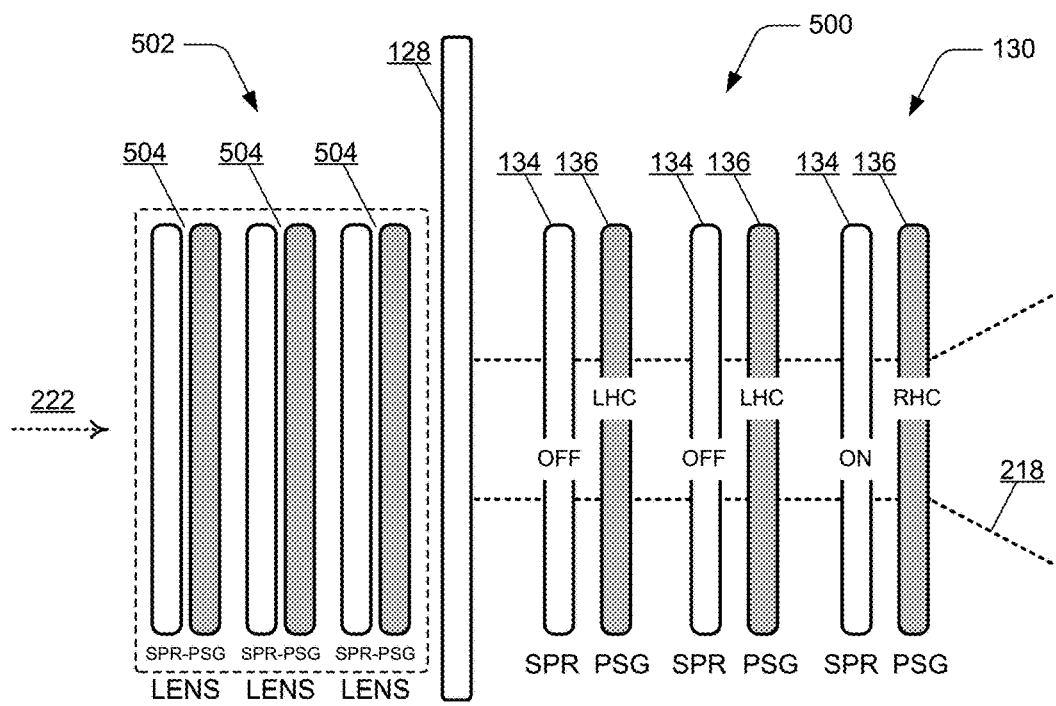
FIG. 5 illustrates a light controller implemented as complementary lenses for the focus accommodation system in aspects of hologram focus accommodation.

FIG. 5 illustrates an example 500 of the focus accommodation system 130 implemented for hologram focus accommodation in the alternate reality device 100, such as shown and described with reference to FIGS. 2 and 3. In this example 500, the light controller 138 is implemented as a complementary lens system 502 of complementary lenses 504 to manage and control the environment light 222 (the see-through light) entering the focus accommodation system 130 from the external environment. The complementary lenses 504 are complements of the lenses 132 of the focus accommodation system 130, and are implemented with the same switchable polarization retarders 134 and polarization sensitive gratings 136. From a perspective of the viewer who is wearing the alternate reality device 100, the lenses 132 of the focus accommodation system 130 are positioned in the imaging path between the waveguide display 128 and an eye of the viewer (e.g., one each for the left and right eyes of the person wearing the alternate reality device). The complementary lens system 502 is positioned between the waveguide display 128 and the environment to then control the environment light 222 that enters and/or passes through the focus accommodation system.

Figure 6:
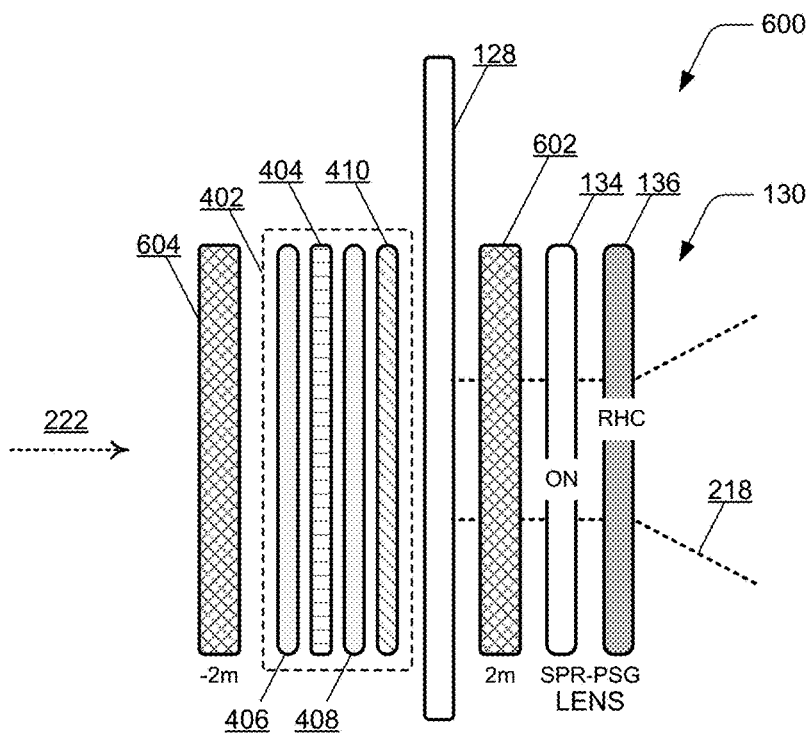
FIG. 6 illustrates another example of the focus accommodation system in aspects of hologram focus accommodation.

FIG. 6 illustrates an example 600 of the focus accommodation system 130 implemented for hologram focus accommodation in the alternate reality device 100, such as shown and described with reference to FIGS. 2 and 3. In this example 600, the focus accommodation system 130 is implemented with a fixed refractive two meter (2 m) lens 602 that adds focal length to the imaging path by use in conjunction with a diffractive lens 132 formed by a switchable polarization retarder 134 and an associated polarization sensitive grating 136. This implementation also includes a complementary refractive minus two meter (−2 m) lens 604 that offsets the fixed refractive lens 602 for an undistorted image of the environment that is viewed through the focus accommodation system. The configuration of the focus accommodation system 130 with the fixed refractive lens 602 and the one lens 132 provides a two-step variable focus, with one step at approximately two meters (2 m) and one step close up at approximately one-half meter (½ m). Although shown positioned between the environment and the shutter system 402, the complementary refractive minus two meter (−2 m) lens 604 can alternatively be implemented between the shutter system 402 and the waveguide display 128 in the example 600.

Example method 700 is described with reference to FIG. 7 in accordance with one or more examples of hologram focus accommodation. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), Systemon-a-chip systems (SoCs), Complex Programmable Logic Devices (CPLDs), and the like.

Figure 7:
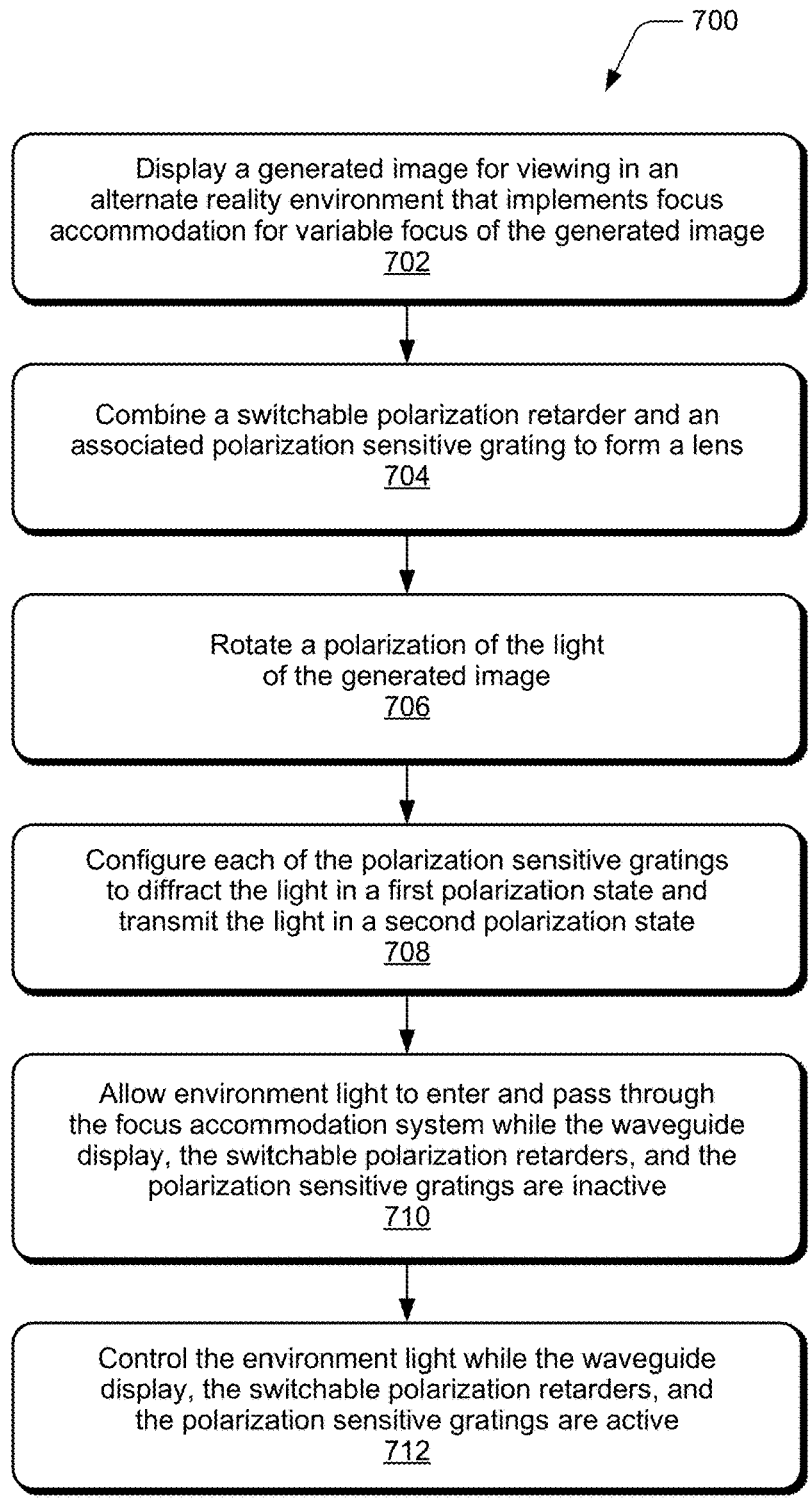
FIG. 7 illustrates an example method of hologram focus accommodation in accordance with one or more implementations.

FIG. 7 illustrates an example method 700 of hologram focus accommodation, and is generally described with reference to the alternate reality device in an alternate reality environment. The order in which the method is described is not intended to be construed as a limitation, and any number or combination of the method operations can be performed in any order to implement a method, or an alternate method.

At 702, a generated image is displayed for viewing in an alternate reality environment implementing variable focus of the generated image. For example, the imaging application 124 generates the holograms 126 that are displayed for viewing on the waveguide displays 128 of the focus accommodation system 130. The waveguide displays 128 provide a simulated stereo display of a hologram 126 in the alternate reality device 100 and can be implemented for see-through viewing of an alternate reality environment 204 that is viewable through an imaging structure that includes the focus accommodation system 130. The variable focus of a generated image (e.g., the hologram 126) is implemented without causing vergence discomfort for a user viewing the generated image, where the variable focus correlates to a distance at which a user is viewing the generated image as displayed by a waveguide display 128. The light 218 of the generated image diverges along the imaging path 220 towards an eye of a user viewing the generated image.

At 704, a switchable polarization retarder and an associated polarization sensitive grating are combined to form a lens. For example, the focus accommodation system 130 is implemented with the lenses 132 that are each formed as a combination of a switchable polarization retarder 134 and an associated polarization sensitive grating 136. A lens can be activated to diffract the light 218 of the generated image (e.g., a hologram 126) or transmit the light 218 at an unaltered angle. Multiple lenses 132 (i.e., three of the lenses) can be configured together to implement an eight-step, multi-focus accommodation effective to represent the generated image appearing between a near focal length and infinity.

At 706, a polarization of the light of the generated image is rotated. For example, the switchable polarization retarders 134 rotate a polarization of the light 218 of the generated image. The light 218 of the generated image passes through the switchable polarization retarders 134 and through the polarization sensitive gratings 136 alternatingly interspersed with the switchable polarization retarders along the imaging path 220 in which the generated image is viewable. The polarization sensitive gratings are each configurable as a right-hand circular polarization sensitive grating for a first polarization state to diffract the light, or as a left-hand circular polarization sensitive grating for a second polarization state to transmit the light without altering the angle of the light.

At 708, each of the polarization sensitive gratings are configured to diffract the light in a first polarization state and transmit the light in a second polarization state. For example, each of the polarization sensitive gratings 136 can be implemented as a left hand circular polarization sensitive grating 304 or as a right hand circular polarization sensitive grating 306. A left hand circular polarization sensitive grating 304 transmits the light 218 of the generated image through the polarization sensitive grating without altering the angle of the light when activated by the corresponding switchable polarization retarder 134 that is turned on. A right hand circular polarization sensitive grating 306 diffracts the light 218 of the generated image when activated by the corresponding switchable polarization retarder 134 that is turned on. Accordingly, each of the polarization sensitive gratings are configurable to diffract the light in a first polarization state and transmit the light in a second polarization state.

At 710, environment light is allowed to enter and pass through the focus accommodation system while the waveguide display, the switchable polarization retarders, and the polarization sensitive gratings are inactive. For example, the light controller 138 manages and controls the environment light 222 (also referred to as the see-through light) entering the focus accommodation system 130 from the external environment. The light controller 138 allows the environment light 222 to enter and pass through the focus accommodation system 130 while the waveguide display 128 and the lenses 132 (e.g., each switchable polarization retarder 134 and associated polarization sensitive grating 136) are inactive.

At 712, the environment light is controlled while the waveguide display, the switchable polarization retarders, and the polarization sensitive gratings are active. For example, the light controller 138 also controls the environment light 222 while the waveguide display 128 and the lenses 132 are active, such as to block, alter, or dim the environment light 222 for a brief duration of time during which the hologram 126 is generated for viewing in the alternate reality device.

Figure 8:
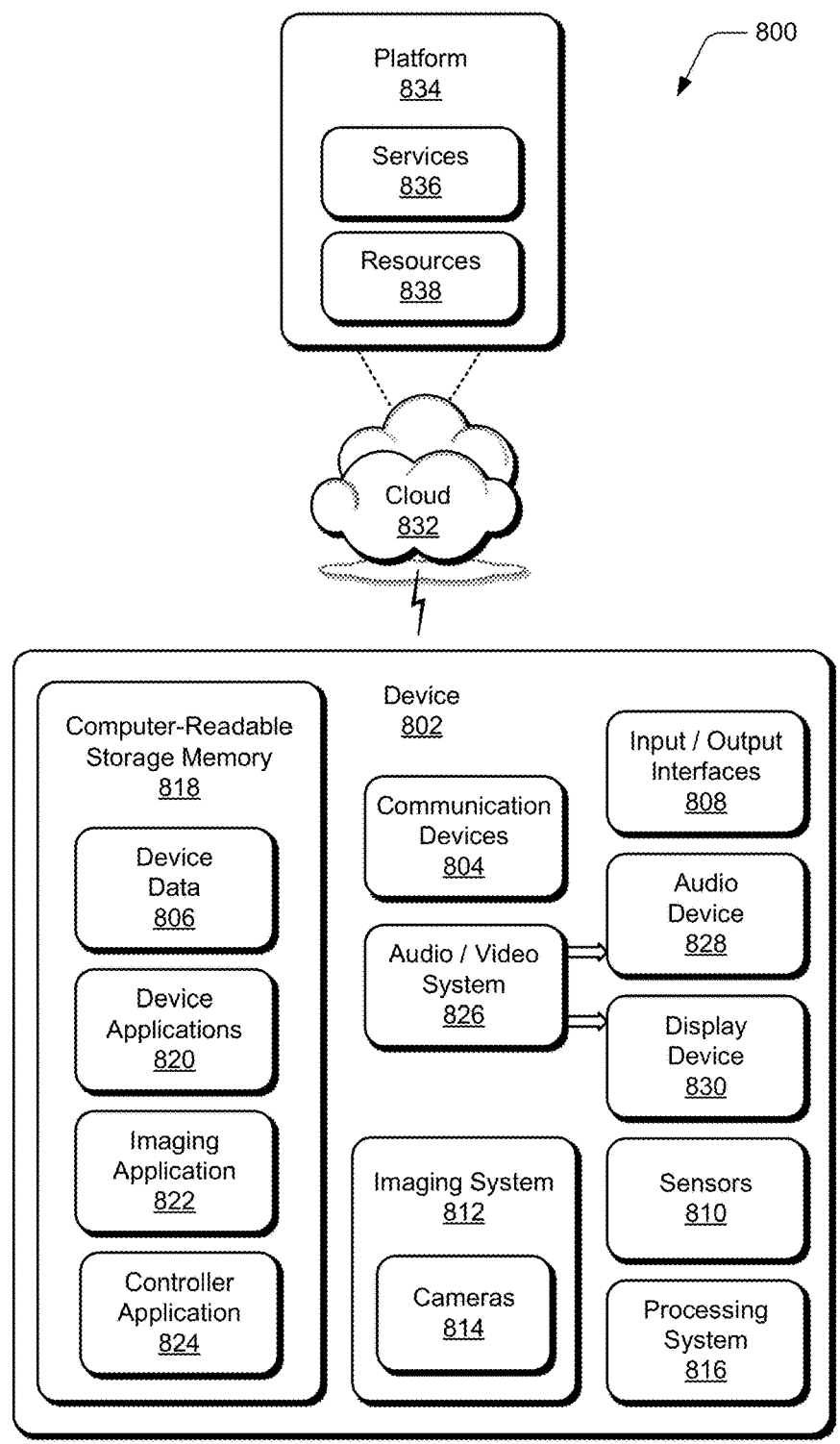
FIG. 8 illustrates an example system with an example device that can implement aspects of hologram focus accommodation.

FIG. 8 illustrates an example system 800 that includes an example device 802, which can implement examples of hologram focus accommodation. The example device 802 can be implemented as any of the computing devices, user devices, and alternate reality devices described with reference to the previous FIGS. 1-7, such as any type of mobile device, wearable device, client device, mobile phone, tablet, computing, communication, entertainment, gaming, media playback, and/or other type of device. For example, the alternate reality device described herein may be implemented as the example device 802 or with various components of the example device.

The example device 802 includes communication devices 804 that enable wired and/or wireless communication of device data 806, such as sensor data, images captured by the cameras, and positioning data associated with one or more of the devices. Additionally, the device data can include any type of audio, video, and/or image data. The communication devices 804 can also include transceivers for cellular phone communication and for network data communication.

The device 802 also includes input/output (I/O) interfaces 808, such as data network interfaces that provide connection and/or communication links between the device, data networks, and other devices described herein. The I/O interfaces can be used to couple the device to any type of components, peripherals, and/or accessory devices. The I/O interfaces also include data input ports via which any type of data, media content, and/or inputs can be received, such as user inputs to the device, as well as any type of audio, video, and/or image data received from any content and/or data source. The device 802 includes any type of sensors 810 (e.g., motion sensors, an inertial measurement unit, and the like). The device 802 also includes an imaging system 812 that includes cameras 814 used to capture images.

The device 802 includes a processing system 816 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 802 may further include any type of a system bus or other data and command transfer system that couples the various components within the device. A system bus can include any one or combination of different bus structures and architectures, as well as control and data lines.

The device 802 also includes a computer-readable storage memory 818, such as data storage devices that can be accessed by a computing device, and that provide persistent storage of data and executable instructions (e.g., software applications, programs, functions, and the like). Examples of the computer-readable storage memory 818 include volatile memory and non-volatile memory, fixed and removable media devices, and any suitable memory device or electronic data storage that maintains data for computing device access. The computer-readable storage memory can include various implementations of random access memory (RAM) (e.g., the DRAM and battery-backed RAM), read-only memory (ROM), flash memory, and other types of storage media in various memory device configurations.

The computer-readable storage memory 818 provides storage of the device data 806 and various device applications 820, such as an operating system that is maintained as a software application with the computer-readable storage memory and executed by the processing system 816. In this example, the device applications include an imaging application 822 and a controller application 824 that implement embodiments of hologram focus accommodation, such as when the example device 802 is implemented as the alternate reality device 100 described herein with reference to FIGS. 1-7. An example of the imaging application 822 includes the imaging application 124 implemented in the alternate reality device 100, as described with reference to FIGS. 1-7.

The example device 802 also includes an audio and/or video system 826 that generates audio data for an audio device 828 and/or generates display data for a display device 830. The audio device and/or the display device include any devices that process, display, and/or otherwise render audio, video, display, and/or image data. In implementations, the audio device and/or the display device are integrated components of the example device 802. Alternatively, the audio device and/or the display device are external, peripheral components to the example device.

In embodiments, at least part of the techniques described for hologram focus accommodation may be implemented in a distributed system, such as over a "cloud" 832 in a platform 834. The cloud 832 includes and/or is representative of the platform 834 for services 836 and/or resources 838. The platform 834 abstracts underlying functionality of hardware, such as server devices (e.g., included in the services 836) and/or software resources (e.g., included as the resources 838), and connects the example device 802 with other devices, servers, etc. The resources 838 may also include applications and/or data that can be utilized while computer processing is executed on servers that are remote from the example device 802. Additionally, the services 836 and/or the resources 838 may facilitate subscriber network services, such as over the Internet, a cellular network, or Wi-Fi network. The platform 834 may also serve to abstract and scale resources to service a demand for the resources 838 that are implemented via the platform, such as in an interconnected device embodiment with functionality distributed throughout the system 800. For example, the functionality may be implemented in part at the example device 802 as well as via the platform 834 that abstracts the functionality of the cloud.

Although implementations of hologram focus accommodation have been described in language specific to features and/or methods, the appended claims are not necessarily limited to the specific features or methods described. Rather, the specific features and methods are disclosed as example implementations of hologram focus accommodation, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following implementations.

A focus accommodation system implemented for variable focus of a generated image, the focus accommodation system comprising: a waveguide display configured to display the generated image for viewing; at least one switchable polarization retarder that is configured to rotate a polarization of light of the generated image, the light passing through the switchable polarization retarder along an imaging path in which the generated image is viewable; and at least one polarization sensitive grating interspersed with the switchable polarization retarder, the light of the generated image passing through the polarization sensitive grating along the imaging path, and the polarization sensitive grating configurable to diffract the light in a first polarization state and transmit the light in a second polarization state.

Alternatively or in addition to the above described focus accommodation system, any one or combination of: the variable focus is adjustable to a focal distance at which a user perceives viewing the generated image as displayed by the waveguide display. Further comprising a light controller configured to: allow environment light passing through the focus accommodation system while the waveguide display, the switchable polarization retarder, and the polarization sensitive grating are inactive; and control the environment light while the waveguide display, the switchable polarization retarder, and the polarization sensitive grating are active. The light controller comprises a shutter system implemented with a shutter positioned between a first linear polarizer and a second liner polarizer adjacent a waveplate. The switchable polarization retarder and the polarization sensitive grating forms a lens of the focus accommodation system, which includes one or more of the lenses; and the light controller comprises a complementary lens system to the one or more lenses of the focus accommodation system. Further comprising a fixed refractive lens that adds focal length to the imaging path by use in conjunction with a diffractive lens formed by the switchable polarization retarder and the polarization sensitive grating. Further comprising a complementary refractive lens that offsets the fixed refractive lens for an undistorted image of an environment viewed through the focus accommodation system. The switchable polarization retarder and the polarization sensitive grating forms a lens of the focus accommodation system, which includes one or more of the lenses; and the variable focus of the generated image is controllable with the one or more lenses to resolve a focus accommodation and stereopsis conflict for a user viewing the generated image. A combination of one or more switchable polarization retarders interspersed with one or more respective polarization sensitive gratings implement an eight-step, multi-focus accommodation effective to represent the generated image appearing between a near focal distance and infinity. The switchable polarization retarder and the polarization sensitive grating forms a lens of the focus accommodation system, which includes one or more of the lenses that are activated to diffract and change an angle of the light of the generated image, or transmit the light of the generated image at an unaltered angle along the imaging path. The one or more lenses are configurable to provide an unmodified focal distance of infinity for viewing the generated image, and wherein the one or more lenses can be activated for a shortest focal distance of the variable focus. The switchable polarization retarder is a liquid crystal (LC) cell and the polarization sensitive grating is a Bragg polarization grating.

A method implementing variable focus of a generated image for hologram focus accommodation, the method comprising: displaying the generated image for viewing in an alternate reality environment that includes one of augmented reality or virtual reality; rotating a polarization of light of the generated image, the light passing through switchable polarization retarders and polarization sensitive gratings alternatingly interspersed with the switchable polarization retarders along an imaging path in which the generated image is viewable; and configuring each of the polarization sensitive gratings to diffract the light in a first polarization state and transmit the light in a second polarization state.

Alternatively or in addition to the above described method, any one or combination of: the variable focus is adjustable to a focal distance at which a user perceives viewing the generated image as displayed by a waveguide display that displays the generated image. Further comprising allowing environment light passing through a focus accommodation system while the switchable polarization retarders and the polarization sensitive gratings are inactive; and controlling the environment light while the switchable polarization retarders and the polarization sensitive gratings are active. Further comprising controlling the variable focus of the generated image to resolve a focus accommodation and stereopsis conflict for a user viewing the generated image. Further comprising combining each of the switchable polarization retarders with an associated polarization sensitive grating to form lenses of a focus accommodation system, the lenses being activated to diffract and change an angle of the light of the generated image, or transmit the light of the generated image at an unaltered angle. Further comprising providing a four-step, multi-focus accommodation with two of the lenses effective to represent the generated image appearing between a near focal distance and infinity.

An alternate reality device implemented for variable focus of a hologram, the alternate reality device comprising: a memory and processor system configured to execute an imaging application that is implemented to generate the hologram for display; a focus accommodation system configured to implement the variable focus for the display of the hologram, the focus accommodation system including: switchable polarization retarders that are each configured to rotate a polarization of light of the hologram, the light passing through the switchable polarization retarders along an imaging path in which the hologram is viewable; and polarization sensitive gratings alternatingly interspersed with the switchable polarization retarders, the light of the hologram passing through the polarization sensitive gratings along the imaging path, and each of the polarization sensitive gratings configurable to diffract the light in a first polarization state and transmit the light in a second polarization state.

Alternatively or in addition to the above described alternate reality device, any one or combination of: each of the switchable polarization retarders are combined with an associated one of the polarization sensitive gratings to form lenses of the focus accommodation system effective to represent the hologram appearing between a near focal distance and infinity.

The invention claimed is:

1. A focus accommodation system comprising:
   a waveguide display configured to display a hologram;
   at least one switchable polarization retarder that is configured to rotate a polarization of light of the hologram, the light passing through the at least one switchable polarization retarder along an imaging path in which the hologram is viewable;
   at least one polarization sensitive grating interspersed with the at least one switchable polarization retarder, the light of the hologram passing through the at least one polarization sensitive grating along the imaging path, and the at least one polarization sensitive grating configurable to diffract the light in a first polarization state and transmit the light in a second polarization state;
   a light controller configured to allow environment light from an external environment to pass through the focus accommodation system; and
   a processing system configured to adjust a focal distance at which a user perceives the hologram with respect to the external environment by controlling the at least one switchable polarization retarder.

2. The focus accommodation system as recited in claim 1, wherein the light controller is configured to:
   allow the environment light from the external environment to pass through the focus accommodation system while the waveguide display, the at least one switchable polarization retarder, and the at least one polarization sensitive grating are inactive; and
   control the environment light while the waveguide display, the at least one switchable polarization retarder, and the at least one polarization sensitive grating are active.

3. The focus accommodation system as recited in claim 2, wherein the light controller comprises a shutter system implemented with a shutter positioned between a first linear polarizer and a second linear polarizer adjacent a waveplate.

4. The focus accommodation system as recited in claim 2, wherein:
   the at least one switchable polarization retarder and the at least one polarization sensitive grating form one or more lenses of the focus accommodation system; and
   the light controller comprises a complementary lens system to the one or more lenses of the focus accommodation system.

5. The focus accommodation system as recited in claim 1, further comprising a fixed refractive lens that adds focal length to the imaging path by use in conjunction with a diffractive lens formed by the at least one switchable polarization retarder and the at least one polarization sensitive grating.

6. The focus accommodation system as recited in claim 5, further comprising a complementary refractive lens that offsets the fixed refractive lens for an undistorted image of the external environment viewed through the focus accommodation system.

7. The focus accommodation system as recited in claim 1, wherein:
the at least one switchable polarization retarder and the at least one polarization sensitive grating form one or more lenses of the focus accommodation system; and
the processing system is configured to control the focal distance with the one or more lenses to resolve a focus accommodation and stereopsis conflict for a user viewing the hologram.

8. The focus accommodation system as recited in claim 1, comprising a combination of multiple switchable polarization retarders interspersed with multiple respective polarization sensitive gratings configured implement an eight-step, multi-focus accommodation effective to represent the hologram appearing between a near focal distance and infinity.

9. The focus accommodation system as recited in claim 1, wherein:
the at least one switchable polarization retarder and the at least one polarization sensitive grating form one or more lenses of the focus accommodation system, and
the processing system is configured to selectively activate the one or more lenses to diffract and change an angle of the light of the hologram or transmit the light of the hologram at an unaltered angle along the imaging path.

10. The focus accommodation system as recited in claim 9, wherein:
the one or more lenses are configurable to provide an unmodified focal distance of infinity for viewing the hologram, and
the processing system is configured to activate the one or more lenses for a shortest focal distance.

11. The focus accommodation system as recited in claim 1, wherein the at least one switchable polarization retarder is a liquid crystal (LC) cell and the at least one polarization sensitive grating is a Bragg polarization grating.

12. The focus accommodation system of claim 1, implemented as a head-mounted display unit.

13. The focus accommodation system of claim 1, implemented as a wearable device.

14. A method comprising:
displaying a holographic image; and
adjusting a focal distance at which the holographic image is perceived with respect to a real-world environment, the adjusting the focal distance comprising:
selectively rotating polarization of the holographic image along an imaging path of the holographic image; and
selectively diffracting the holographic image based at least on the polarization.

15. The method of claim 14, further comprising:
selectively allowing external light from the real-world environment to pass through an imaging path along which the holographic image is viewable.

16. The method of claim 15, wherein the selectively allowing is performed by selectively shuttering the external light.

17. A wearable device comprising:
a switchable polarization retarder configured to rotate polarization of a generated image;
a polarization sensitive grating configured to diffract the generated image in a first polarization state and transmit the generated image in a second polarization state;
a light controller configured to allow environment light from an external environment to pass through an imaging path of the generated image; and
a processing system configured to adjust a focal distance at which a user perceives viewing the generated image concurrently with the external environment by controlling the switchable polarization retarder.

18. The wearable device of claim 17, the light controller comprising a shutter system.

19. The wearable device of claim 17, the light controller comprising a complementary lens system.

* * * * *